Patented Jan. 2, 1940

2,185,969

UNITED STATES PATENT OFFICE 2,185,969

CLEAR AQUEOUS SOLUTIONS OF LIPINS AND PROCESS OF PREPARING THE SAME

Hermann Eduard Schultze, Marbach, near Marburg/Lahn, Germany, assignor to Winthrop Chemical Company, Inc., New York, N. Y., a corporation of New York No Drawing. Application September 29, 1936, Serial No. 103,206. In Germany May 24, 1935

9 Claims. (Cl. 167—65)

The present invention relates to a process of preparing clear, aqueous solutions of lipins particularly of lipins of animal, vegetable and synthetic origin.

In spite of many attempts, it was hitherto impossible to transform according to a general applicable process the various kinds of lipins of animal or vegetable origin as well as their natural accompanying substances into a clear purely aqueous solution. The effects hitherto obtained in this direction are unsatisfactory, because the aqueous solutions obtained in known manner are very unstable and are already demixed by water, dilute electrolyte solutions, particularly by those of a biological composition, but also by colloidal ingredients of the blood plasma. Such labile solutions are, for instance, inconvenient for injection purposes since owing to precipitation there is at once formed at the place of injection a depot which resorbs only with difficulty.

Now I have found that lipins of vegetable or animal origin as well as the water-insoluble, lipin-soluble substances occuring as their natural accompanying substances and the synthetically prepared compounds of this group of substances may be transformed into aqueous solutions by adding to the aqueous suspension of the lipin substance a compound of the formula:

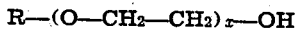

R—(O—CH₂—CH₂)ₓ—OH wherein R stands for an alkyl radical with at least 8 carbon atoms and $x$ stands for a whole number of at least 4. On account of their excellent solubility in water as well as in lipins, the compounds of this formula—hereinafter called polyethers—have the property of assembling with the lipin substances in such a manner that a water-soluble body is formed. Other, similarly formed polyethyleneglycol derivatives with correspondingly good water- and lipin-solubility are also suitable as agents bringing about the aqueous dissolution of lipins.

Some lipins, for instance, pure phosphatides or protagon, have a considerable swelling power in water so that turbid, aqueous suspensions may readily be obtained therefrom. A relatively small addition of polyether is sufficient in order to dissolve such lipins already in the cold after a short duration of action so as to obtain a clear solution. Most of the natural lipins however have a very small aqueous swelling power because they contain, besides phosphatides, considerable quantities of neutral fats or neutral oils, sterines, waxes and other water-insoluble substances and therefore cannot perceptibly be dissolved by a simple addition of polyether. In such cases it is suitable to act upon the suspensions of lipins to which polyether has been added, with such measures as normally de-mix the aqueous polyether solution. Such actions are, for instance, the addition of electrolytes, such as ammonium sulfate or sodium chloride in concentrations which are necessary for the separation of a de-mixed phase or which lie near the de-mixing concentration. The necessary quantity of electrolytes is strongly reduced by heating the aqueous mixture of lipin and polyether containing electrolytes. In this manner it is possible to dissolve most of the natural lipins already by the addition of sodium chloride in a physiological quantity by heating to 100° C. in a dilute, aqueous polyether solution. The heating is suitably carried out in a closed vessel so that a slight pressure may occur. The addition of small quantities of alkalies, i. e., such quantities that the pH of the mixture is somewhat displaced to the alkaline side up to maximally pH=8.0, is often advantageous. The addition of organic substances having lipin-dissolving properties and a limited water-solubility, for instance, phenol, tricresol or amylalcohol, which also cause a de-mixing in aqueous polyether solutions, has been proved to be useful for the dissolution in water or in physiological sodium chloride solution of lipins which can be dispersed only with difficulty. In this case the dissolution occurs already in the cold at a certain concentration of the corresponding organic substance, which concentration depends on the experimental conditions and which decreases when the content of electrolyte and the degree of alkalinity increase. In order to observe also in this case physiological conditions a pH-value of 8.0 shall not be exceeded. The organic de-mixing agent which has been added may be eliminated again after the dissolution of the lipin, for instance, by a dialysis without the clearness of the lipin solution obtained being deterimentally affected.

I have furthermore found that, in the place of the above mentioned lipin dissolving substances which have only a limited solubility in water, the water-insoluble usual fat solvents, such as hydrocarbons and the halogen derivatives thereof and water-insoluble higher fat alcohols as additions to aqueous lipin suspensions to which some percentages of polyether have been added, may effect at 50° C. to 100° C. the clear dissolution of the lipin. The fat solvents in question dissolve to a limited extent in aqueous polyether solutions to a clear solution. When the temperature is increased beyond a certain degree the system is de-mixed but when it is cooled it becomes clear again. When a lipin is heated suitably in a closed vessel above the de-mixing point of the polyether with a dilute aqueous polyether solution and a certain quantity of the fat solvent a rapid disaggregation of the particles in water takes place also when absolutely water-insoluble lipins, such as pure waxes, sterines or neutral ethers are used and when the whole is cooled the completely clear dissolution occurs. In these cases, too, the fat solvent added may be eliminated again without the danger of an after-turbidity, for instance, by a distillation. When lipins are used which readily crystallize, such as cholesterol, it is suitable to add and to dissolve at the same time an indifferent lipin, for instance, a neutral oil or a derivative which cannot be crystallized, for instance, when cholesterol is used, a cholesterol-fatty acid ester.

The invention may be applied to the various lipins whether of animal or vegetable and also of synthetic origin. For example, it may be applied to oils, fats and their derivatives, phosphatides, waxes, sterols and their derivatives whether these be in the form of native or artificial mixtures. The process makes it possible to dissolve lipins to clear solutions in water even in a high degree of concentration. Whereas hitherto most of the therapeutically important substances of the lipin group could be injected only in oil or other non-physiological solvents in consequence of their insolubility in water or in the form of aqueous emulsions or suspensions, the invention makes it possible to transform such derivatives into isotonic aqueous solutions. In this manner a truly physiological form of injection giving optimal conditions of resorption is possible and a strong deep-seated action is secured for percutaneous application. The aqueous solutions of lipins which can be obtained remain clear when mixed with serum or when diluted with physiological sodium chloride solution in every mixing proportion. The natural condition of the solution for lipins and their natural lipin-soluble accompanying substances which are known to be insoluble in water but which are obtained as clear solutions in considerable concentrations in serum or plasma is considerably reproduced by the process. It is also possible to enrich these substances to many times their content in plasma without affecting the condition of the solution thereby.

The following examples serve to illustrate the invention, but they are not intended to limit it thereto:

(1) 10 parts of lipoid extracted from horses' serum are heated at 100° C. for a short time in a closed vessel with 5 parts of polyethyleneglycololeyl ether in 85 parts of physiological sodium chloride solution. A clear solution is formed containing 10 per cent of lipoid, 3.3 per cent of cholesterol and 4.5 per cent of lecithin.

By heating to 50° C. to 60° C. a clear solution may be obtained in a corresponding manner consisting of:

2 per cent of serum lipoid and 5 per cent of polyethyleneglycol-monododecyl ether
2 per cent of oleic acid and 6 per cent of polyethyleneglycololeyl ether
2.5 per cent of kephalin and 6 per cent of polyethyleneglycololeyl ether
3.5 per cent of lecithin and 6 per cent of polyethyleneglycololeyl ether
2 per cent of total lipoid from tubercular bacilli (2) A mixture consisting of 2.5 parts of triolein, 3.5 parts of toluene, 90 parts of water and 6 parts of polyethyleneglycololeyl ether is heated for half an hour to 90° C. in a closed vessel. On cooling it, while gently agitating, a clear solution is obtained from the coazervate which also after evaporation of the toluene added remains clear in the vacuum.

(3) By the same treatment as described in Example 2 there is produced from 1 per cent of cholesterol and 3 per cent of cholesterol-oleic acid ester in a physiological sodium chloride solution to which there are added 6 per cent of polyethyleneglycololeyl ether by addition of 0.6 per cent by volume of chloroform a coazervate rich in water which on cooling dissolves to a clear solution and also after evaporation of the chloroform does not become turbid or opalescent.

(4) A mixture of 2 parts of cod liver oil, 1.8 parts of nonyl alcohol and 6 parts of polyethyleneglycololeyl ether with 100 parts of water is boiled in a reflux apparatus for half-an-hour; a clear solution is produced which remains clear after evaporation of the alcohol.

(5) A clear solution of 1 per cent of vitamin D is obtained by shortly heating to about 60° C. in a closed vessel 1 part of vitamin D, 1 part of triolein, 6 parts of polyethyleneglycololeyl ether, 0.4 part of methylene chloride and 90 parts of physiological sodium chloride solution. The methylene chloride may be subsequently evaporated without the vitamin solution becoming turbid.

(6) A mixture of 2.5 parts of cera alba or beeswax, 6 parts of polyethyleneglycololeyl ether and 2.5 parts of heptyl alcohol is heated in a closed vessel for a short time to about 100° C. with 100 parts of physiological sodium chloride solution; after cooling to 70° C. there remains a clear aqueous solution. The heptyl alcohol added is subsequently evaporated in the vacuum.

(7) A fine emulsion of 0.5 per cent of poppy oil, 0.5 per cent of lecithin and 0.5 per cent of polyethyleneglycololeyl ether in physiological sodium chloride solution is transformed into a clear solution by the addition of 1.5 per cent of phenol and 1 per cent of 1 n caustic soda solution. By dialyzing for a short time in isotonic sodium chloride solution the phenol added is separated without precipitation of the dissolved substances.

(8) 1 part of protagon from hog's brain is allowed to swell in the cold in 100 parts of water. An entirely turbid suspension is obtained. After the addition of 2 parts of polyethyleneglycololeyl ether a clear solution is obtained when the whole has been allowed to stand for several hours.

I claim:

1. Process which comprises heating 1 part of cholesterol and 3 parts of cholesterol oleyl acid ester in a physiological sodium chloride solution containing 6 parts of polyethyleneglycololeyl ether and a small quantity of chloroform and subsequently eliminating substantially all the chloroform.

2. A process which comprises heating to about 60° C. in a closed vessel 1 part of vitamin D, 1 part of triolein, 6 parts of polyethyleneglycololeyl ether, 0.4 part of methylene chloride and 90 parts of physiological sodium chloride solution, and subsequently eliminating substantially all the methylene chloride.

3. A clear aqueous solution consisting of 3 per cent. of cholesterol oleyl acid ester, 6 per cent. of polyethyleneglycololeyl ether and 1 per cent. of cholesterol dissolved in a physiological sodium chloride solution.

4. A clear aqueous solution consisting of about 1 per cent. of vitamin D, about 1 per cent. of triolein, about 6 per cent. of polyethyleneglycoloeyl ether and dissolved in physiological sodium chloride solution.

5. Process of preparing clear aqueous solutions of lipins of vegetable, animal or synthetic origin and the water-insoluble, lipin-soluble substances naturally accompanying them which comprises admixing the lipin substance with water, a partially water-soluble to water-insoluble fat solvent, and a compound of the following general formula $R-(O-CH_2-CH_2)_x-OH$ wherein R stands for an alkyl radical with at least 8 carbon atoms and $x$ stands for a whole number of at least 4, and thereafter eliminating substantially all said fat solvent from the resulting solution.

6. Process of preparing clear aqueous solutions of lipins of vegetable, animal or synthetic origin and the water-insoluble, lipin-soluble substances naturally accompanying them which comprises admixing the lipin substance with water, a partially water-soluble to water-insoluble fat solvent, and a compound of the following general formula $R-(O-CH_2-CH_2)_x-OH$ wherein R stands for an alkyl radical with at least 8 carbon atoms and $x$ stands for a whole number of at least 4, and distilling from the resulting solution substantially all said fat solvent.

7. Process of preparing clear aqueous solutions of lipins of vegetable, animal or synthetic origin and the water-insoluble, lipin-soluble substances naturally accompanying them which comprises admixing the lipin substance with water, a partially water-soluble to water-insoluble fat solvent, and polyethyleneglycoloeyl ether, and distilling from the resulting solution substantially all said fat solvent.

8. A process which comprises heating to about 100° C. in a closed vessel 2.5 parts of beeswax, 6 parts of polyethyleneglycoloeyl ether, 2.5 parts of heptyl alcohol and 100 parts of physiological sodium chloride solution, and subsequently eliminating substantially all the heptyl alcohol.

9. A clear aqueous solution consisting of 2.5 parts of beeswax and 6 parts of polyethyleneglycoloeyl ether dissolved in 100 parts of physiological sodium chloride solution.

HERMANN E. SCHULTZE.